Aug. 10, 1954  P. W. MARTIN ET AL  2,686,268
WELL LOGGING DEVICE
Filed Aug. 10, 1951  2 Sheets-Sheet 1
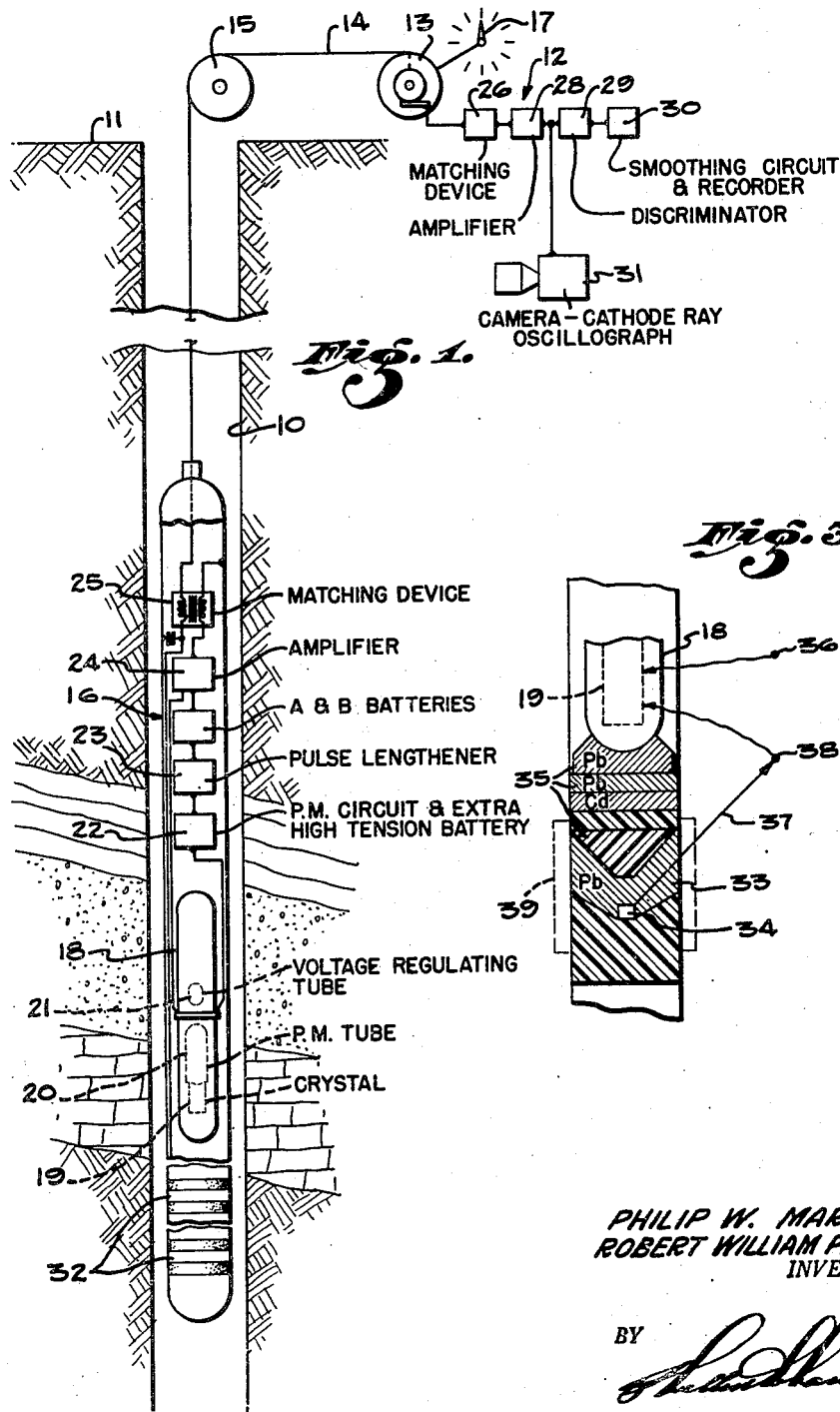
PHILIP W. MARTIN,
ROBERT WILLIAM PRINGLE,
INVENTORS.
BY
ATTORNEY

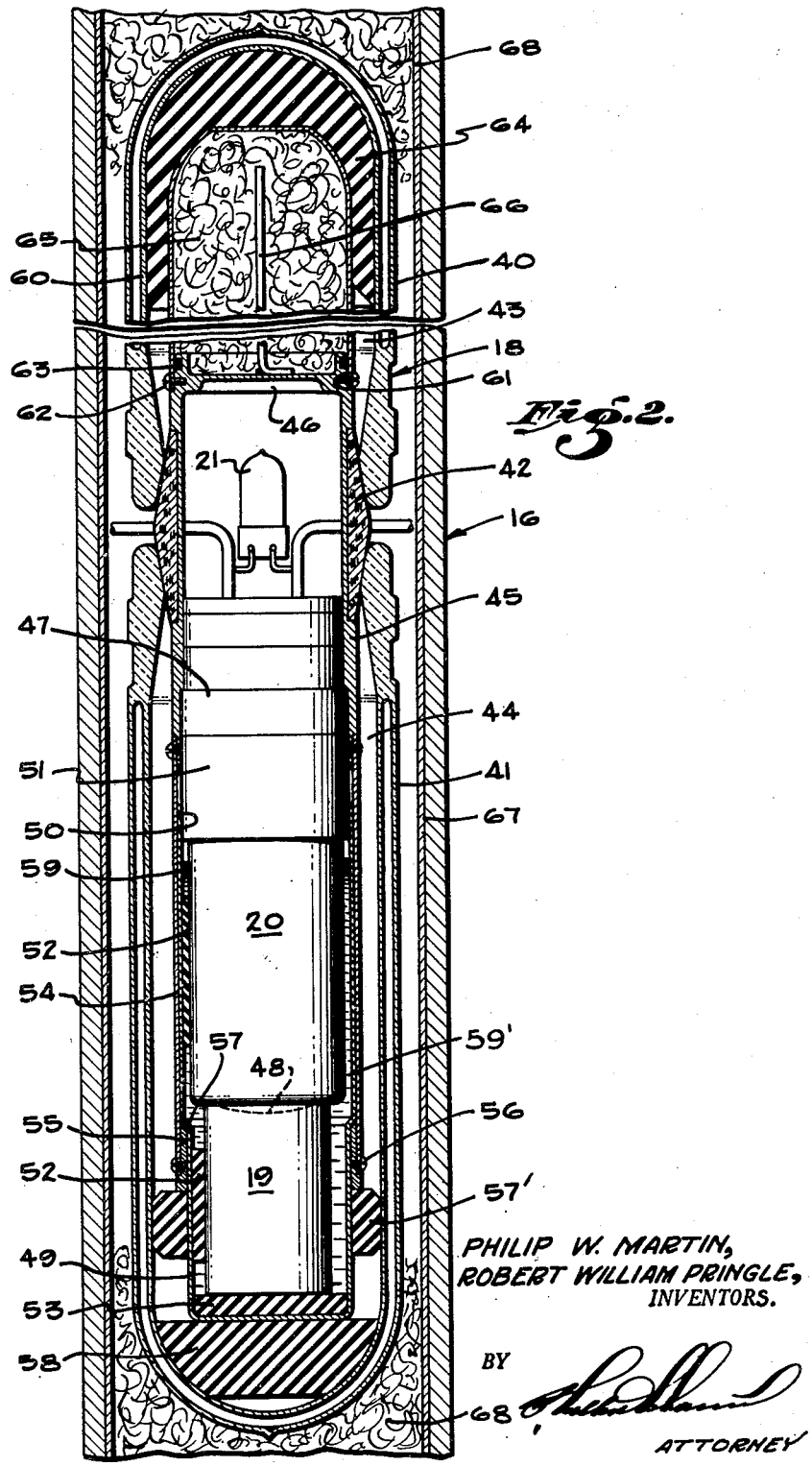

Patented Aug. 10, 1954

2,686,268

UNITED STATES PATENT OFFICE 2,686,268

WELL LOGGING DEVICE

Philip W. Martin, Huntington Park, Calif., and Robert William Pringle, Winnipeg, Manitoba, Canada Application August 10, 1951, Serial No. 241,334

18 Claims. (Cl. 250—71)

The present invention relates generally to devices for the detection, measurement and evaluation of radioactive radiations, and is more particularly concerned with improvements in such devices, which will permit their being effectively utilized in underground surveys, such as in the logging of underground formations and conditions existing in bore holes.

The invention is especially useful in connection with oil wells for the logging of the various geological formations therein; and also provides a most valuable adjunct and tool for locating areas within an oil well casing to be gun-perforated in a manner and for the purpose well understood in the oil industry.

In its broad concept, the present invention contemplates an oil well logging device which utilizes the basic principles of a radiation detector such as described in detail with its concomitant electronic operating circuits in the copending application of Robert W. Pringle, et al., Serial No. 138,218, covering portable ray meters.

The invention further contemplates a well logging device, which may incorporate and be simultaneously utilized in combination with an electric log system and apparatus such as disclosed in United States Letters Patent of Philip W. Martin, No. 2,501,953, entitled Electric Well Logging System.

It is one object of the herein described invention to provide improved well logging means having greater reliability than the devices heretofore utilized; which has extremely high sensitivity; which has wide spectral response; and which is fast of operation and of small physical size. The latter feature is of particular importance in that it allows a determination of the exact thicknesses of formations in a manner much more accurate than possible hitherto. This has been illustrated in a very striking manner by the results thus far obtained, and is of the utmost importance where oil bearing sands of thickness of the order of one or two feet, are being investigated.

A further object is to provide in a device of the herein described character, improved means for mounting, cooling, and protecting the radiation responsive means and associated devices within a remote exploration unit arranged for controlled movement within a bore hole.

A further object is to provide an improved arrangement of devices which may constitute a surface station containing pulse amplifying means, discriminating means for a spectrum analysis, and suitable means for recording pulsations transmitted from the remote exploration unit.

A further object resides in the provision of a novel electrical interconnection between the remote exploration unit and the surface station, through a conducting medium which is connected in the circuit through matching devices enabling most efficient power transmission of the pulsations.

A still further object is to provide a remote exploration unit for oil well logging which is readily accommodated for the detection of both natural gamma rays, and gamma rays induced by neutrons from a source contained in the exploration unit.

Still another object is to provide in connection with the exploration unit, a neutron howitzer by means of which the neutrons are caused to be emitted in a beam into the adjacent structural formations of the well bore.

Still another object is to provide novel means for displacing well fluid in the vicinity of the neutron source so as to facilitate entry of the neutrons into the adjacent formation, which might otherwise be impeded by the well fluids.

It is also an object to provide in connection with the surface station a camera cathode ray oscillograph for the observation and photographing of pulse height distributions indicative of gamma ray spectrum lines; and the combination of differential and integral discriminators for the achievement thereof.

In brief, the above objects are accomplished by providing remote and surface stations which are electrically interconnected. The remote station comprises an exploration unit which may be controlled in its movement within a bore hole. This exploration unit in its simplest form contains a scintillation crystal adapted to produce scintillations upon bombardment by naturally occurring gamma rays or neutron capture gamma rays. By the utilization of suitable sensing means, responsive to the scintillations, pulses are produced, amplified and modulated.

The pulses are transmitted from the exploration unit through a cable conducting circuit which is interconnected between the remote station exploration unit and the elements comprising the surface station by means of matching devices which permit the most efficient transmission of the pulses.

At the surface, the transmitted pulses are carried through further instrumentalities, as will hereinafter be more specifically mentioned, by means of which the pulses may be discriminated, recorded and studied in connection with the well logging operation.

Provision is also made for artificially cooling the scintillation sensing means, and for protecting and maintaining the scintillation crystal in a dry state, so that these elements may operate under proper conditions.

Novel means are also provided in connection with the exploration unit, which means may be added as an accessory or additional unit, for beaming neutrons from a source into the adjacent formations of the well structure to produce gamma rays which in turn are picked up by the scintillation crystal of the device.

The arrangement briefly described above permits a determination to be made of the location and nature of not only naturally occurring radioactivity, but also permits the physical and chemical determination of the structure of the strata or adjacent formations. Novel means are also provided for displacing adjacent well fluid in order to facilitate entry of the neutrons into the adjacent strata or formation.

Further objects of the invention will be brought out in the following part of the specification, wherein detailed description is for the purpose of fully disclosing the invention without placing limitations therein.

Referring to the accompanying drawings, which are for illustrative purposes only:

Fig. 1 is a diagrammatic view of an oil well bore illustrating the manner in which the present invention may be employed, and further depicting a block schematic circuit diagram of the elements comprising the remote exploration unit and the surface station;

Fig. 2 is an enlarged sectional view taken longitudinally through the detecting cell of the exploration unit; and Fig. 3 is a view schematically illustrating a modification of the exploration unit for incorporating a neutron howitzer.

Referring to the drawings, there is illustrated in Fig. 1 a typical well bore structure 10 which passes from the ground surface 11 downwardly past a plurality of different formation structures which have been distinguished in the drawings by means of various types of shading.

At the ground surface, there is illustrated a surface station as generally indicated by numeral 12. This station includes suitable hoisting equipment which may include a hoisting drum 13 from which a hoisting cable conductor 14 is trained over a guide pulley 15 and connected to an exploration unit within the well bore, as generally indicated by the numeral 16. As shown, the hoisting drum is provided with suitable indicating mechanism, which may comprise a rotating pointer 17 associated with a graduated dial, or other suitable means for indicating the amount of cable which has been wound and unwound thereon or in other words the position of the exploration unit within well bore.

With the equipment briefly described above, the exploration unit may be readily controlled and moved within the well bore in the carrying out of the logging operation.

More specifically, the exploration unit comprises the sealed sensing cell 18 within which there is mounted a scintillation crystal 19 or other suitable means having the property of sensing the presence of gamma rays. In the present instance, a large mass crystal of sodium iodide activated with thallium is used. This crystal has the desirable property of converting gamma ray energy into light scintillations and is transparent to the passage of the light produced therein. This crystal is hygroscopic and in order to operate properly must be kept cool and dry. One of the features of the herein described invention is to provide a suitable housing for this crystal in order that it may be utilized in well logging apparatus.

Associated with the crystal 19 in a manner which will be hereinafter described in detail, is a photo-electric multiplier tube 20 or other suitable means for converting the scintillations into pulses of current. Tube 20 is so constructed that it acts as an electron multiplier.

There is also disclosed in Fig. 1, a voltage regulating tube 21 for regulating the voltage supply on the photo-electric multiplier tube 20 and thereby obtaining stable operation.

After electron multiplication of the pulses, in the tube 20, the pulses are conducted from the photo-electric multiplier tube circuit 22 into a pulse lengthener 23 wherein the pulses are increased in width to facilitate their amplification by means of an amplifier 24. It should be noted that certain advantages are to be obtained from the mounting of circuit 22 in the cell 18 and this is, therefore, to be regarded as an alternative arrangement to the one illustrated in Fig. 1, this being the manner in which the instrument has in fact been utilized in the field.

The amplifier 24 connects through a matching device 25, which has been illustrated in this instance as comprising a transformer having suitable matching characteristics, to one end of the cable 14.

The cable in this instance may be of the type utilized in oil field work for gun-perforating, and in length may be on the order of 15,000 to 20,000 feet. In general the cable comprises a copper core conductor which is surrounded by rubber insulation upon the outer surface of which reversed double layers of steel strand are applied. Such a cable has a capacity of approximately 1.5 microfarads and a resistance of 55 ohms. By placing a similar matching device 26 at the surface station 12, which may be connected through suitable means such as a brush contact 27 with the upper end of the cable, electrical characteristics are obtained which permit the most efficient transmission of the pulses from the exploration unit to the surface station.

At the surface station 12, it is possible to utilize a variety of methods of indicating and recording the pulses and their characteristics depending upon the particular type of survey or data which is being studied or observed. In connection with the present invention, the pulses are again conducted through an amplifier 28 from which they may be selectively conducted to a discriminator 29 and smoothing circuit and recorder 30, or from the amplifier to a camera cathode ray oscillograph 31.

Spectrum analysis of the gamma radiation is possible either by utilizing combinations of differential discriminator and/or integral discriminator such as discussed in greater detail in the aforementioned pending application of Robert W. Pringle et al., or by means of cathode ray oscillograph 31 with camera attachment for observation and photographing of the pulse height distribution indicative of gamma ray spectrum lines.

It is believed that the manner of utilizing the invention in general will be understood from the foregoing description, and that further discussion of the general operations will be unnecessary. While battery sources of electrical supply are disclosed as being contained within the exploration unit, it will be appreciated that such sources need not be so located, and that through suitable arrangements the sources could even be located at the surface and connected with the exploration unit through suitable connections.

The device of the present invention may be utilized in combination with the arrangement utilized for electric logs after the manner of the system described in the Philip W. Martin Patent Serial No. 2,501,953, mentioned above. By incorporating one or more insulated electrodes 32, which are mounted at the lower end of the exploration unit 16 the well bore may be electrically logged simultaneously with the utilization of the device previously described and constituting the present invention, thus eliminating the necessity of conducting separate surveys.

By utilizing a neutron source in conjunction with the crystal and sensing means of the present invention within the bore hole, it is possible to ascertain the location of the oil bearing strata, the location of salt water normally associated with the deposit of the oil and organic and mineral formations. For such purpose, the exploration unit 16 may be modified as shown in Fig. 3. The arrangement there disclosed, and commonly known as the neutron howitzer, comprises a generally conical layer of metallic lead, as indicated by the numeral 33, in which its upper and lower surfaces are in radially diverging relation. A neutron source 34 is positioned centrally of the lower surface of the lead layer, and this layer is physically spaced and separated from the crystal 19 by a series of superposed layers of absorbing materials, which are generally indicated by the numeral 35. In the present instance the absorbers have been shown as comprising layers of plastic material, cadmium, and lead or other suitable metals such as tungsten or heavy alloys. These layers may be arranged in alternate layers. Likewise, a relatively thick layer of plastic is mounted supportingly below the layer 33. As thus arranged, the crystal 19 may be bombarded by a natural gamma ray as indicated by the numeral 36. The crystal may also be bombarded by neutrons from the source 34 which will be beamed due to the physical structure of the layer 33 along a path, for example, as indicated by numeral 37, into the adjacent well formation where a gamma ray as indicated at 38 may be induced and likewise bombard the crystal 19.

Work in this field has indicated that the presence of certain fluids in the well bore may deter movement of the neutron from the source 34 into the adjacent well formations, and under certain circumstances the obtainment of desirable results is materially interfered with. In order to overcome this problem, it is proposed in the present invention to place an adjustable sleeve 39, as shown in dotted lines in Fig. 3, around the exploration unit at the position of layer 33. This sleeve 39 will displace the well fluid at this location and facilitate entry of the neutrons into the adjacent bore formation. This sleeve may be made of lead or constructed of other suitable medium permitting passage of the neutrons therethrough.

As previously mentioned, the present invention is specifically concerned with means for cooling, protecting and keeping the crystal and the associated sensing means in a dry condition and at proper temperature for operating in a reliable manner without causing drift.

Referring to Fig. 2, the construction of the cell 18 will now be described in detail. The cell 18 comprises vacuum bottles 40 and 41 which are supported with their open ends in confronting relation and sealed by an annular sealing member 42 of cork or other suitable material. The vacuum bottles respectively form compartments 43 and 44 which are in heat transfer relation with each other through a metal body 45 which constitutes a thermal conductor and supports on its periphery the sealing member 42.

The body 45, at its end which projects into the compartment 43 is closed by an end wall structure 46, and at its other end is provided with a socket arrangement 47 for supporting and making electrical connection with the photoelectric multiplier tube 20. The lowermost end of the tube envelope is slightly bulged as shown at 48, this bulge being in intimate surface engagement with the adjacent end of the crystal 19 which has its surface ground or otherwise suitably conformed to the bulged portion 48 in order to properly transmit the scintillations from the crystal to the tube.

The crystal 19 and tube 20 are housed within an enclosing cap container 49 which engages at its open end 50 with the outer surface of the tube base 51, as shown. The crystal and tube are supported against vibration by means of pads 52 of rubber or other suitable material which are placed between the outer surfaces thereof and the wall of the cap container 49. The lowermost end, the closed end, of the cap container contains a pad 53, of rubber or suitable material, which cushions the crystal 19 in an endwise direction and maintains it against endwise movement.

The assembly just described is retained in position by an outer sleeve member 54 which is secured at one end to the end of the metal body 45 which projects into compartment 44. At its other end, the sleeve 54 is provided with an internal end ring 55 which is removably retained by screws 56 in engagement with a circumferentially extending offset shoulder 57 formed in the wall of the cap container 49, thus serving to lockingly retain the cap container in proper position and prevent its detachment. The closed end of the cap container 49 is resiliently bushed within the vacuum bottle 41 by means of an annular gasket 57' of rubber or other suitable material, while the end is cushioned by an end pad 58. Adjacent the open end of the cap container, the container is sealed with respect to the envelope of the tube 20 by means of an O-ring 59. The remaining space between the cap container wall and the outer walls of the crystal and tube 20 is filled with a suitable liquid 59' such as silicone which will protect these devices against moisture.

Within the compartment 43, the end wall structure 46 of the metal body 45 supports a cap container 60 having an open end 61 inserted over the end of the metal body 45 and secured as by screws 62. This end of the cap container is sealed with respect to the adjacent body wall by an O-ring 63. The opposite end of the cap container, the closed end, is supported in a pad cushion 64 which extends over the container end and is interposed between its end and the adjacent wall of the vacuum bottle 40.

The cap container 60 forms a reservoir for a charge of cooling medium such as ice or other suitable means as indicated by the numeral 65. The thermal conductivity of the metal body 45 is extended into the cap container 60 by providing a member 66, in this case an elongate rod which is secured at one end to the end wall structure 46 of the metal body 45. By this means, the heat transfer from the metal body to the ice is facilitated.

The cell 18 may be mounted in various ways within the tubular wall of the exploration unit. In the present instance, the cell has been mounted in a tubular liner 67 within which it may be secured as by the utilization of glass wool 68 at the opposite ends and sides of the cell. By utilizing a separate tubular liner, the cell and associated batteries, control elements, etc. may be initially packed and inserted as an assembled unit into the tubular wall of the exploration unit, which may be made up of sections which may be interconnected to include the additional attachments of insulated electrodes 32, and neutron howitzer, as shown in Fig. 3, etc.

Various modifications may suggest themselves to those skilled in the art without departing from the spirit of the present invention, and hence, we do not wish to be restricted to the specific form or forms shown or uses mentioned, except to the extent indicated in the appended claims.

While the invention has been more or less specifically described and illustrated herein with respect to the interconnecting circuits between the surface and exploration unit and as to the surface instruments, it will be evident that multiple channels and the individual or combined use of instruments comes within the scope of the invention. For example, a number of discriminators may be connected to discriminate as to the nature of received pulses, and hence, measure the physical and chemical characteristics of the geological formations. Thus by utilizing separate pen recorders it would be possible to simultaneously and separately record characteristics related to the various elements of the formation.

We claim:

1. In a device for detecting radiations: a multi-compartment cell structure having outer walls of low thermal conductivity; signalling means in one of said compartments responsive to radiation bombardment; a cooling medium in another of said compartments; and means interconnecting said compartments including a member independent of said walls having relatively high thermal conductivity, whereby a heat exchange flow path is established between said compartments independently of said walls.

2. In a device for detecting radiations: a heat conducting body of relatively high thermal conductivity; a pair of vacuum bottles supported with their open ends in confronting relation and their interiors connected into heat transfer relation through said body independently of the bottle walls; and signalling means in one of said bottles responsive to radiation bombardment, said signalling means being cooled by a cooling medium contained in the other of said bottles.

3. In a device for detecting radiations: a heat conducting body; a pair of bottles having heat insulated walls, said bottles being supported with their open ends in confronting relation and their interiors thermally connected through said body independently of said walls; signalling means responsive to radiation bombardment; a sealed container in one of said bottles housing said signalling means; and a cooling medium contained within the other of said bottles.

4. In a device for detecting radiations: a heat conducting body; a pair of heat insulated bottles supported with their open ends in confronting relation and their interiors thermally connected through said body; signalling means responsive to radiation bombardment; a sealed container in one of said bottles housing said signalling means; a liquid medium within said sealed container forming a moisture protective bath for said signalling means; and a cooling medium contained within the other of said bottles.

5. In a device for detecting radiations: a heat conducting body; a pair of bottles having heat insulated walls, said bottles being supported with their open ends in confronting relation and their interiors thermally connected through said body independently of their walls; signalling means responsive to radiation bombardment; a sealed container in one of said bottles housing said signalling means; resilient means extending between the associated wall of said container and bottle; and a cooling medium contained within the other of said bottles.

6. In a device for detecting radiations: a heat conducting body; a pair of heat insulated bottles supported with their open ends in confronting relation and their interiors thermally connected through said body; signalling means in one of said bottles responsive to radiation bombardment; a coolant contained within the other of said bottles; and a thermal conductive member extending from said body into the bottle containing said coolant.

7. In a device for detecting radiations: a heat conducting body having an interior cavity; a pair of heat insulated bottles supported with their open ends in confronting relation and their interiors thermally connected through said body; and signalling means in one of said bottles responsive to radiation bombardment and cooled by a cooling medium contained in the other of said bottles, said signalling means including a voltage regulating device positioned within said cavity.

8. In a device for detecting radiations: a heat conducting body; a pair of heat insulated bottles supported with their open ends in confronting relation and their interiors thermally connected through said body; signalling means in one of said bottles responsive to radiation bombardment; and a sealed container in the other of said bottles adapted to contain and support a cooling medium in heat exchange relation to said body.

9. In a device for detecting radiations: a heat conducting body; a pair of heat insulated bottles supported with their open ends in confronting relation and their interiors thermally connected through said body; signalling means in one of said bottles responsive to radiation bombardment; a sealed container in the other of said bottles adapted to contain and support a cooling medium in heat exchange relation to said body; and resilient supporting means extending between said sealed container and the adjacent wall of the bottle.

10. In a device for detecting radiations, an exploration unit comprising: an elongate housing; a temperature controlled cell adjacent one end of said housing containing means responsive to radiation bombardment; an insulated electrode carried by said housing; and signal transmitting means controlled by said radiation means and said electrode in accordance with characteristics of a medium external of said unit.

11. A device for detecting and measuring subsurface gamma rays, comprising: an exploration unit containing means activated by gamma ray bombardment; electronic sensing and signalling means responsive to said activation; a cable conductor for controlled subsurface movement of said exploration unit, and forming a circuit connection to said sensing and signalling means from the surface; means at the surface connected to said cable controlled by said signal including an integral and a differential discriminator, whereby the bombarding gamma ray characteristics may be ascertained; and a camera cathode ray oscillograph connected with said discriminator for photographing the pulse height distribution indicative of said gamma ray.

12. A well exploring device capable of detecting radiation from the earth, comprising: a scintillating crystal; means for detecting and measuring the scintillations from the crystal; and integral, differential and cathode ray tube pulse height sorters.

13. A well exploring device capable of detecting radiations from the earth, comprising: a crystal capable of scintillating under the effect of said radiations; means for multiplying and detecting an effect of the scintillations from said crystal; and surface means for discriminating and indicating the pulse heights of said scintillations, whereby an analysis may be made of energy spectrum of the radiations.

14. A device for detecting and measuring sub-surface radiations, comprising: an exploration unit containing means activated by radiation bombardment; sensing and signalling means responsive to said activation; a cable conductor for controlled subsurface movement of said exploration unit, and forming a circuit connection to said sensing and signalling means from the surface; means at the surface connected to said cable controlled by said signal including a differential discriminator, whereby the bombarding radiation characteristics may be ascertained and recorded.

15. In a device for detecting sub-surface penetrative radiation; an insulating wall structure defining an envelope; signalling means in said envelope; and a self-contained medium positioned in said envelope in heat exchange relation with said signalling means, said medium being adapted through change of state to stabilize the operating temperature of said signalling means.

16. A well exploring device capable of detecting radiation from the earth, comprising: a scintillating crystal; means for detecting an effect of said scintillations; means for temperature stabilizing said crystal and said detecting means; and means for the pulse height sorting of the effects of said scintillations, thus permitting an analysis of the energy spectrum of said radiations from the earth.

17. A well exploring device capable of detecting radiations from the earth, comprising: first means capable of scintillating under the effect of said radiations; second means for multiplying and detecting an effect of said scintillations; means for temperature stabilizing said first means and said second means; and means for measuring the detected effect of said scintillations.

18. A well exploring device capable of detecting radiations from the earth, comprising: an insulated wall structure defining an envelope; scintillating means in said envelope; other means in said envelope for multiplying and detecting an effect of said scintillations; and self-contained means in said envelope in heat exchange relation with said scintillating means and said other means, for stabilizing the operating temperature thereof; and means for measuring the detected effect of said scintillations.

References Cited in the file of this patent

UNITED STATES PATENTS

| Number | Name | Date |
|---|---|---|
| 2,103,078 | Holst et al. | Dec. 21, 1937 |
| 2,351,028 | Fearon | June 13, 1944 |
| 2,365,763 | Kalb et al. | Dec. 26, 1944 |
| 2,433,554 | Herzog | Dec. 30, 1947 |
| 2,470,224 | Scherbatskoy | May 17, 1949 |
| 2,522,522 | Krasnow | Sept. 19, 1950 |
| 2,543,676 | Thayer et al. | Feb. 27, 1951 |
| 2,573,999 | Victoreen | Nov. 6, 1951 |
| 2,590,873 | Krasnow et al. | Apr. 1, 1952 |
| 2,648,778 | Silverman et al. | Aug. 11, 1953 |